United States Patent [19]

Suzuki et al.

[11] Patent Number: 5,283,891
[45] Date of Patent: Feb. 1, 1994

[54] ERROR INFORMATION SAVING APPARATUS OF COMPUTER

[75] Inventors: Shinichiro Suzuki, Tokyo; Yoichiro Takeuchi, Urawa; Ikuo Uchihori, Tokyo; Tadashi Ishikawa, Tokyo; Ryuji Sakai, Tokyo, all of Japan

[73] Assignee: Kabushiki Kaisha Toshiba, Kawasaki, Japan

[21] Appl. No.: 926,174

[22] Filed: Aug. 7, 1992

[30] Foreign Application Priority Data

Aug. 8, 1991 [JP] Japan .................................. 3-199541
Nov. 15, 1991 [JP] Japan .................................. 3-300338

[51] Int. Cl.$^5$ ............................................. G06F 11/00
[52] U.S. Cl. ............................. 395/575; 364/247.3; 364/231.8; 364/265
[58] Field of Search ............... 364/247.3, 265, 231.8, 364/266; 395/575; 371/12

[56] References Cited

U.S. PATENT DOCUMENTS 4,443,849  4/1984  Ohwada ............................ 371/12
4,701,915 10/1987  Kitamura et al. .................. 395/575
4,811,283  3/1989  Gembarowski ................... 395/575

Primary Examiner—Hoa Nguyen
Attorney, Agent, or Firm—Oblon, Spivak, McClelland, Maier & Neustadt

[57] ABSTRACT

An error information saving apparatus of a computer includes at least one arithmetic unit, a plurality of storage units, and a control unit, connected to the storage units and the arithmetic unit, for controlling these units to perform a predetermined pipeline operation, wherein the storage units comprise an arithmetic register file consisting of a plurality of registers each of which can be designated as a destination operand in a statement of an operation instruction, a status flag string consisting of a plurality of flags provided in a one-to-one correspondence with the registers of the arithmetic register file, and a destination register number holding unit for sequentially saving and holding the numbers of destination registers of all operations performed while error interrupt processing generated after occurrence of an error is delayed by a predetermined time interval, each time one of the operations is completed.

5 Claims, 6 Drawing Sheets

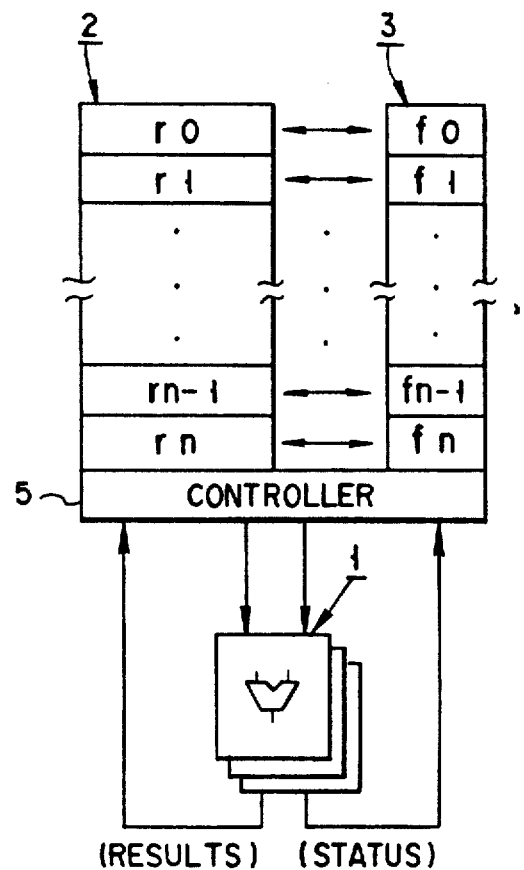
F I G. 1
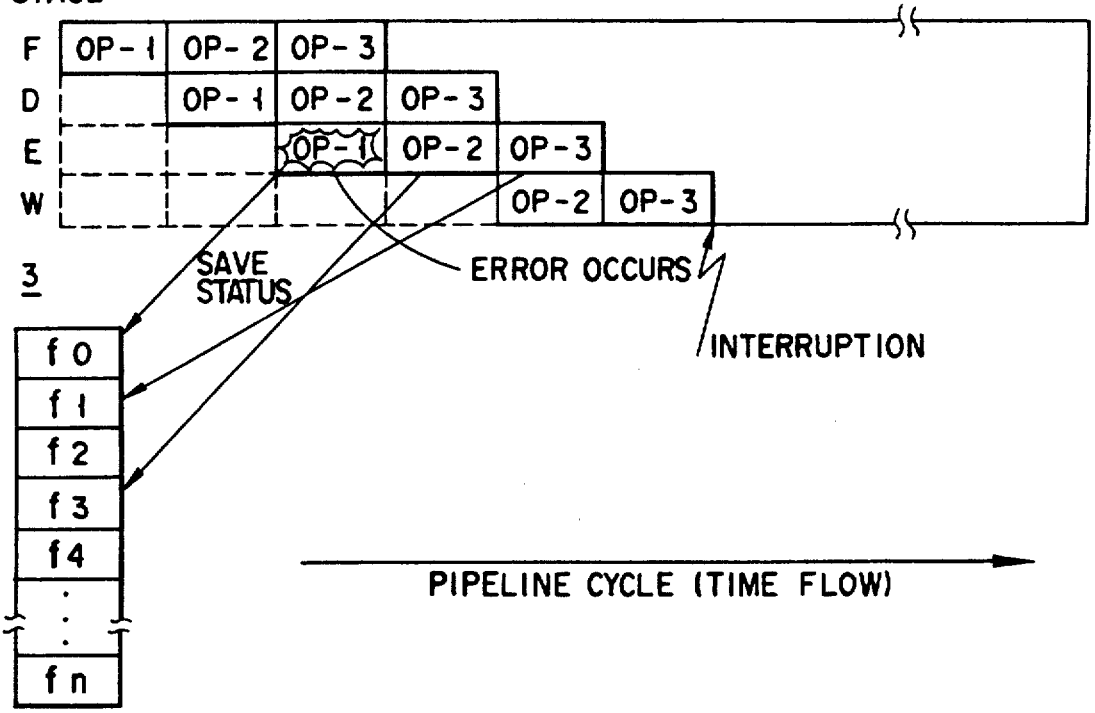
F I G. 2

ERROR INFORMATION SAVING APPARATUS OF COMPUTER

BACKGROUND OF THE INVENTION

1. Field of the Invention

The present invention relates to an error information saving apparatus of a computer, which performs saving of error information in a computer for performing a pipeline operation.

2. Description of the Related Art

Conventionally, there exit a number of computers for performing a pipeline operation as shown in FIG. 6 in order to improve their operation performances. In this pipeline operation, a first operation instruction (to be referred to as OP-1 hereinafter), for example, is fetched (abbreviated F). During the next machine cycle, this operation instruction OP-1 is decoded (abbreviated D) and the next operation instruction OP-2 is fetched at the same time. During the subsequent machine cycle, the first operation instruction OP-1 is executed (abbreviated E), the operation instruction OP-2 is decoded, and a new operation instruction OP-3 is fetched at the same time. In the subsequent cycle, the result of the executed operation instruction OP-1 is written-back (abbreviated W), and a new instruction is fetched. In such an operation system, i.e., a pipeline operation having the operation stages as described above, even when the execute stage (E) is not finished in one pipeline cycle, the same arithmetic unit can sequentially fetch and execute subsequent instructions without stopping operation cycles of an instruction pipeline.

If, for example, an error occurs in a computer for performing this pipeline operation, it is generally difficult or impossible to specify an instruction (statement) which caused the error or a destination register to be used in an operation as an object to be scanned upon recovery. This is so because, in current systems, if an error requiring activation of an "error interrupt routine" occurs during execution of the pipeline operation, execution of this error interrupt routine is started after execution of all instructions already fetched before occurrence of the error is completed in order not to cause a conflict in an operation after returning from this interrupt routine. As a result, since instructions subsequent to the one which caused the error are already executed when the error interrupt routine is activated, the contents of various registers and flags set immediately after occurrence of the error have been rewritten. Therefore, it is often considered impossible to specify the location of an error on the instruction word level.

Assume, for example, that an error occurs during execute (E) of the operation instruction OP-1 shown in FIG. 6. In this case, the status of that operation is written in a single status flag (f) 3, and the statuses of the subsequent operation instructions OP-2 and OP-3 are overwritten in the same status flag 3. Since the status written in this status flag 3 at the time the interrupt routine is activated is the one obtained when execution of the operation instruction OP-2 is finished, the status at the time of occurrence of the error cannot be specified. As a result, error recovery is often impossible in an error information acquiring system having the above arrangement.

Especially in a parallel processor system in which a plurality of different arithmetic units can be simultaneously used in the execute stage (E), there is a high possibility that the above-mentioned problem occurs. In addition, it is much more difficult to correctly recognize an order of a number of operations parallel-processed after occurrence of an error and to perform correct recovery processing.

In the case of a "floating-point operation instruction" requiring a plurality of cycles in executing it as shown in FIG. 7, recovery processing is more complicated. That is, even when a status must be referred to, a floating-point addition instruction "A" is set in a status flag in the fifth pipeline cycle. Therefore, the status of a floating-point multiplication instruction "M" cannot be set. As a result, when the status flag is referred to by an instruction "G" for referring to the status of the floating-point multiplication instruction "M", the status of the multiplication instruction "M" to be referred to is not set during a period S. As a consequence, since the pipeline processing is stopped, a time interval of hatched portions shown in FIG. 7 is wasted, and this makes it difficult to prevent a decrease in a pipeline processing efficiency.

In a conventional computer for performing the pipeline operation as described above, a possibility of successful error recovery is very low, and this results in a tendency to sacrifice the reliability of the computer to some extent in order to improve its performance. On the other hand, in a computer having a high reliability as its characteristic feature, if, for example, the execute stage of an instruction pipe-line exceeds one machine cycle, control is performed such that the instruction pipeline is stalled in correspondence with the excess so that only one instruction is constantly present on the execute stage, thereby improving the performance of the computer. As a result, there is a tendency to abandon a further improvement obtainable using the operation pipeline but to reliably specify the location of an error to enable recovery processing.

As described above, in conventional computers for performing the pipeline operation, it is very difficult to specify the location of an error on the instruction word level. In addition, when a plurality of errors occur in succession as shown in FIG. 8, i.e., if one error occurs and another occurs before all instructions already fetched are completely executed and an error interrupt routine is activated, it is very difficult to specify the number or order of these errors. Furthermore, even if it is possible to achieve a high performance of a computer by the pipeline operation, a possibility of realizing correct recovery against errors is very low. Therefore, it is difficult to obtain both a high performance and a high reliability at the same time.

SUMMARY OF THE INVENTION

The present invention has been made to solve the above conventional problems and has as its object to provide a computer for performing a pipeline operation in order to obtain a high performance, comprising an error information saving apparatus which can reliably recognize the status of an operation instruction to make it possible to easily recognize the result of the operation instruction, and can keep its high performance and high reliability as a computer system by having a recovery function against errors without sacrificing the original operation performance of the computer.

The error information saving apparatus of a computer according to the present invention comprises a plurality of arithmetic units, a plurality of storage units used in processing performed by the arithmetic units, and a controller, connected to the storage units and the arithmetic units, for controlling these parts in order to perform a predetermined pipeline operation.

The storage units are constituted by an arithmetic register file consisting of a plurality of registers each of which can be designated as a destination operand in a statement of an operation instruction, a status flag string consisting of a plurality of flags provided in a one-to-one correspondence with the registers of the arithmetic register file, and a destination register number holding unit for sequentially saving and holding the numbers of destination registers of all operations, which are executed while error interrupt processing generated after occurrence of an error is delayed by a predetermined time interval, each time execution of one of the operations is completed.

In the above error information saving apparatus, statuses indicating the results of operation instructions can be saved in the status flag string consisting of a plurality of flags provided in a one-to-one correspondence with the registers each designated as a destination operand in the statement of a given one of the operation instructions, and this provides the following effects. That is, the results of the respective operations can be easily recognized. In addition, when an error occurs, an operation instruction which caused the error can be specified by checking the contents of the respective status flags. Therefore, it is possible to realize an error recovery function for the high reliability as a computer system without sacrificing the operation performance.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

Brief Description of the Drawings

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing an arrangement of an error information saving apparatus according to the first embodiment of the present invention;

FIG. 2 is a view for explaining an error information saving operation of the first embodiment;

Detailed Description of the Preferred Embodiments

First Embodiment

FIG. 1 is a block diagram showing the first embodiment of the present invention. An error information saving apparatus of a computer according to the first embodiment comprises arithmetic units 1 capable of performing a pipeline operation, a register file 2 constituted by registers r0 to rn each designated and used as an operand of an operation instruction, and a status flag string 3 constituted by status flags f0, f1, f2, . . ., fn provided in a one-to-one correspondence with the registers r0, r1, r2, . . ., rn of the register file 2. The status flag string 3 is set to store a status indicating the result of an operation instruction in a status flag corresponding to a destination register of that operation.

The error information saving apparatus of this embodiment also includes a controller 5 for saving the status of an operation in one of the flags f0, f1, f2, . . ., fn of the status flag string 3, which corresponds to a destination register of that operation.

The operation of the error information saving apparatus of a computer according to the first embodiment having the above arrangement will be described below.

This computer processes instructions by "pipelining" as shown in FIG. 2. The processing in this instruction pipeline is constituted by four stages of fetch (F), decode (D), execute (E), and write-back (W). The arithmetic units 1 can perform a pipeline operation.

If, for example, an error occurs in the execute stage (E) of a first operation instruction OP-1 as shown in FIG. 2, the controller 5 saves the status of this operation instruction OP-1 in the flag f0 of the status flag string 3, which corresponds to a destination register of the operation instruction OP-1 in the register file 2. The controller 5 also saves the status obtained in the execute stage (E) of the next operation instruction OP-2 in the flag f3 of the status flag string 3. Similarly, the controller 5 saves the status obtained in the execute stage (E) of the subsequent operation instruction OP-3 in the flag f1 of the status flag string 3. If an error occurs in the operation instruction OP-1 as described above, an interrupt routine can easily determine a register of the register file 2 as the destination of this operation which caused the error by sequentially checking the contents saved in the flags f0, f1, . . ., fn of the status flag string 3.

A manner of referring to statuses of floating-point operation instructions requiring a plurality of execution cycles will be described below with reference to FIG. 3.

Figure 3:
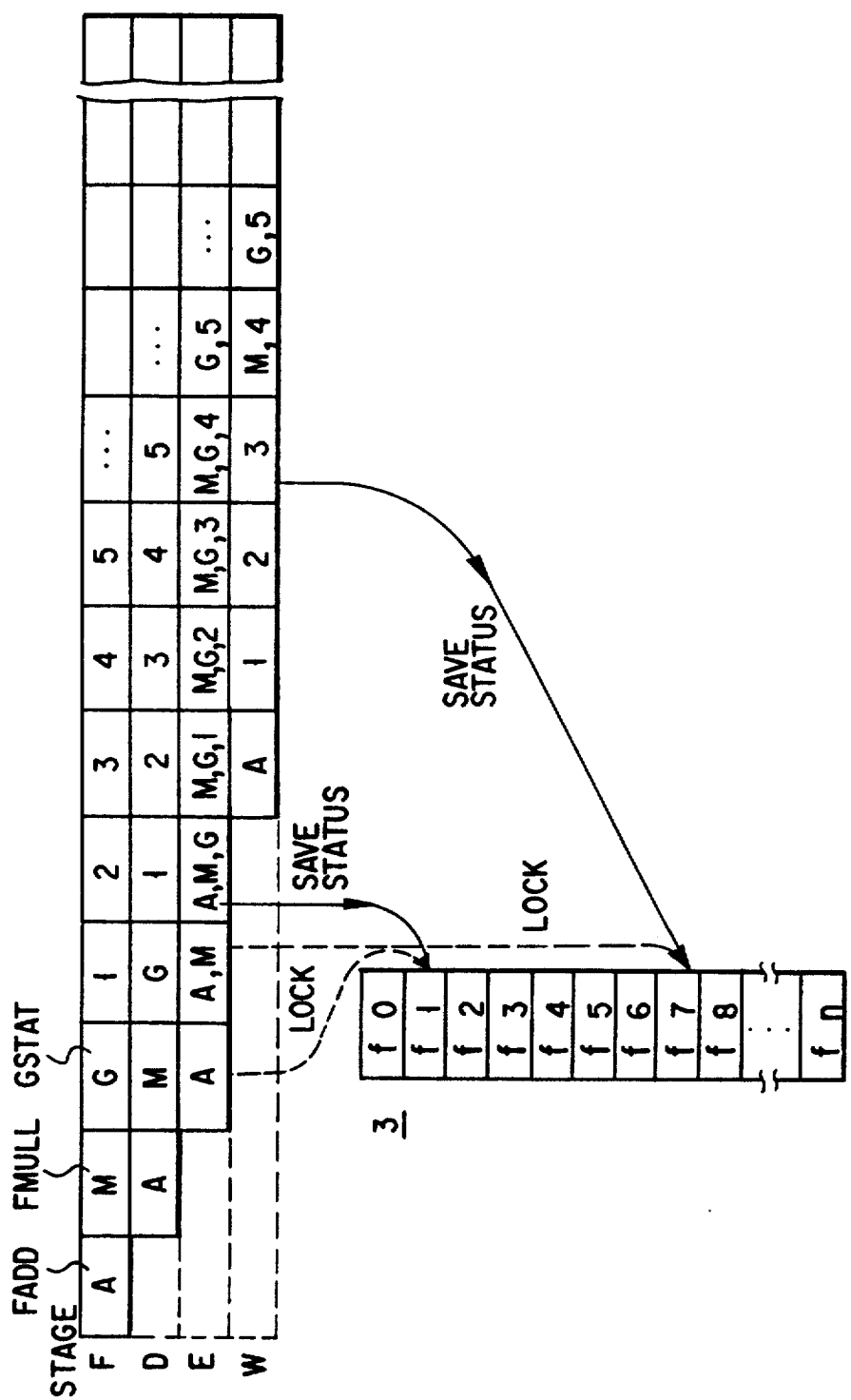
FIG. 3 is a view for explaining the error information saving operation of the first embodiment.

Referring to FIG. 3, a first operation instruction "A" is a floating-point addition instruction (e.g., FADD), and "M" is a floating-point multiplication instruction (e.g., FMULL). "G" is a reference instruction (e.g., GSTAT) of referring to the status of "M". For example, the first operation instruction "A" is fetched (F), and "M" is fetched (F) at the same time "A" is decoded (D). In the next pipeline cycle, execute (E) of the operation instruction "A", decode (D) of the operation instruction "M", and fetch (F) of the reference instruction "G" are simultaneously performed. In this case, the operation instruction "A" is locked in the flag f1 of the status flag string 3.

In the next pipeline cycle, the operation instruction "M" is locked in the flag f7 of the status flag string 3. In the subsequent pipeline cycle, the operation instruction "A" finishes its execute stage (E), and the status of "A"

is saved in the flag f1 of the status flag string 3. At this time, the reference instruction "G" for referring to the status of the floating-point multiplication instruction "M" advances to the execute stage (E). In the next pipeline cycle, the operation instruction "A" advances to the write-back (W). After three subsequent pipeline cycles, the status of the floating-point multiplication instruction "M" is saved in the flag f7 of the status flag string 3. In the next pipeline cycle, the multiplication instruction "M" advances to the write-back stage (W). At this time, the reference instruction "G" for the floating-point multiplication is in the execute stage (E). In the subsequent pipeline cycle, the reference instruction "G" advances to the write-back (W).

With the above operation, pipeline processing can be executed without stopping it unlike in conventional systems, and the efficiency of the pipeline processing is also improved.

According to the present invention, the statuses of the respective operation instructions are set in the status flag string 3. Therefore, error information can be correctly acquired during execution of a pipeline operation, and this makes it possible to largely improve the possibility of error recovery without sacrificing a high-speed performance.

Note that the present invention is not limited to the above first embodiment. In addition, the present invention can be widely applied to general computers for performing a pipeline operation.

In the first embodiment of the present invention, the status flags are provided in a one-to-one correspondence with the arithmetic registers, and this achieves the following effect. That is, in a computer for performing a pipeline operation in order to improve its performance, statuses indicating the execution results of individual operation instructions can be reliably recognized. Therefore, by referring to these status flags, the result of an operation instruction of interest can be easily recognized and analyzed.

As a result, there is provided an error information saving apparatus which can improve a recovery function against errors and can achieve a high reliability without sacrificing the original operation performance of a computer.

Second Embodiment

Figure 4:
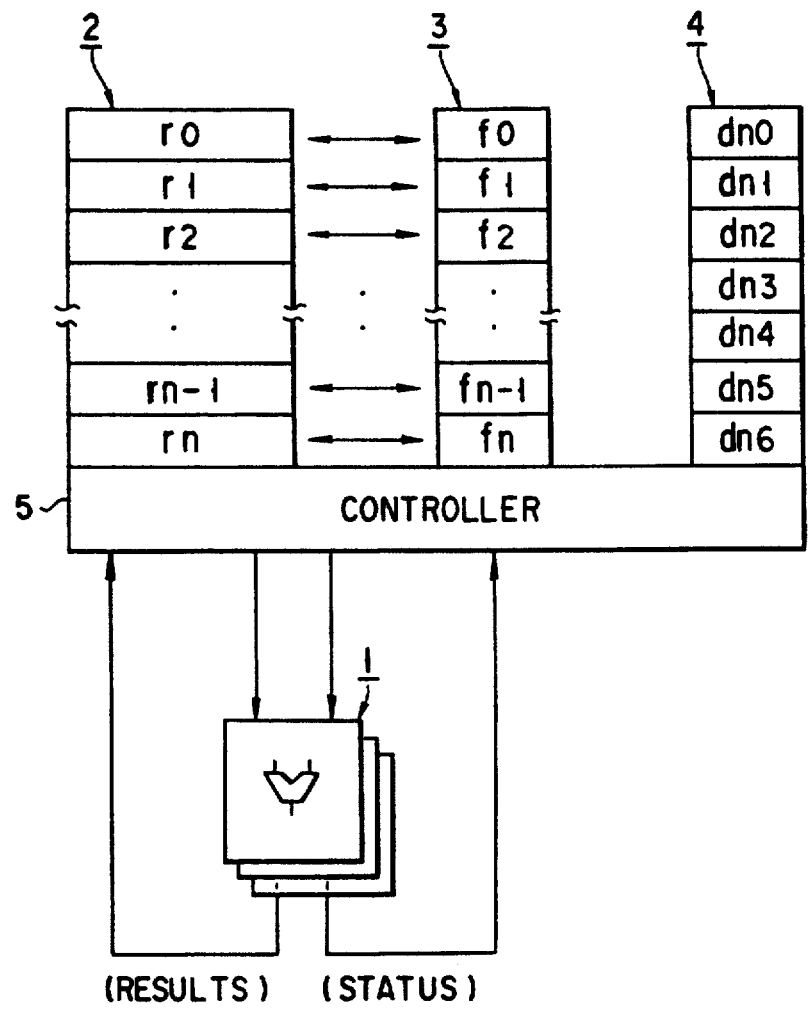
FIG. 4 is a block diagram showing an arrangement of an error information saving apparatus according to the second embodiment of the present invention.

FIG. 4 is a block diagram showing the second embodiment of the present invention.

As shown in FIG. 4, an error information saving apparatus according to the second embodiment includes the following constituting elements in addition to the constituting elements of the first embodiment described above.

That is, this error information saving apparatus is characterized by further comprising a destination register number holding unit 4 constituted by registers dn0, dn1, dn2, . . ., dn6 for holding numbers 0, 1, 2, . . ., n, respectively, of destination registers of operations.

When an error occurs, a plurality of instruction statements already fetched (F) before occurrence of the error are completely executed (E) before activation of an error interrupt routine. Each time the result of one of these instructions is written-back (W) in a corresponding one of registers of a register file 2, the above destination register number holding unit 4 holds or saves the number of that register subjected to the write-back (W) in one of the registers dn0 to dn6.

In this second embodiment, the destination register number holding unit 4 is constituted by the seven registers dn0 to dn6, but the number of registers is not limited to that of this arrangement. The number of registers constituting the destination register number holding unit 4 is set equal to a maximum number of instruction statements which can be written-back during execution of all fetched instructions performed from the timing at which an error occurs in an operation procedure shown in FIG. 4 to the timing at which an error interrupt is generated.

Each of the registers dn0 to dn6 is constituted by register elements (e.g. fields number) provided in a number corresponding to a maximum number of operation instructions which can simultaneously advance to the write-back stage (W) in an instruction pipeline. In addition, even when this maximum number of operation instructions advance to the write-back stage (W) at the same time, the numbers of their destination registers are simultaneously saved in one of the registers dn0 to dn6. Therefore, this maximum number, i.e., the number of register elements (e.g. field number) constituting each of the registers dn0 to dn6 for holding destination register numbers is set equal to the number of a plurality of arithmetic units 1.

In addition to the basic function of the first embodiment in that the status of each operation is saved in one of status flags f0, f1, f2, . . ., fn of a status flag string 3, which corresponds to one of registers of a register file 2, which is designated by that operation, the error information saving apparatus of the second embodiment has a function to be described below. That is, if, for example, an error requiring an "operation interrupt" for recovery occurs and detection of this error is performed using the status of a given operation, the number of a register written-back as the result of this operation is recorded (i.e. stored) in one of the registers dn0 to dn6 of the destination register number holding unit 4. This function is performed entirely by a controller 5.

The operation of the error information saving apparatus according to the second embodiment having the above arrangement will be described below.

Figure 5:
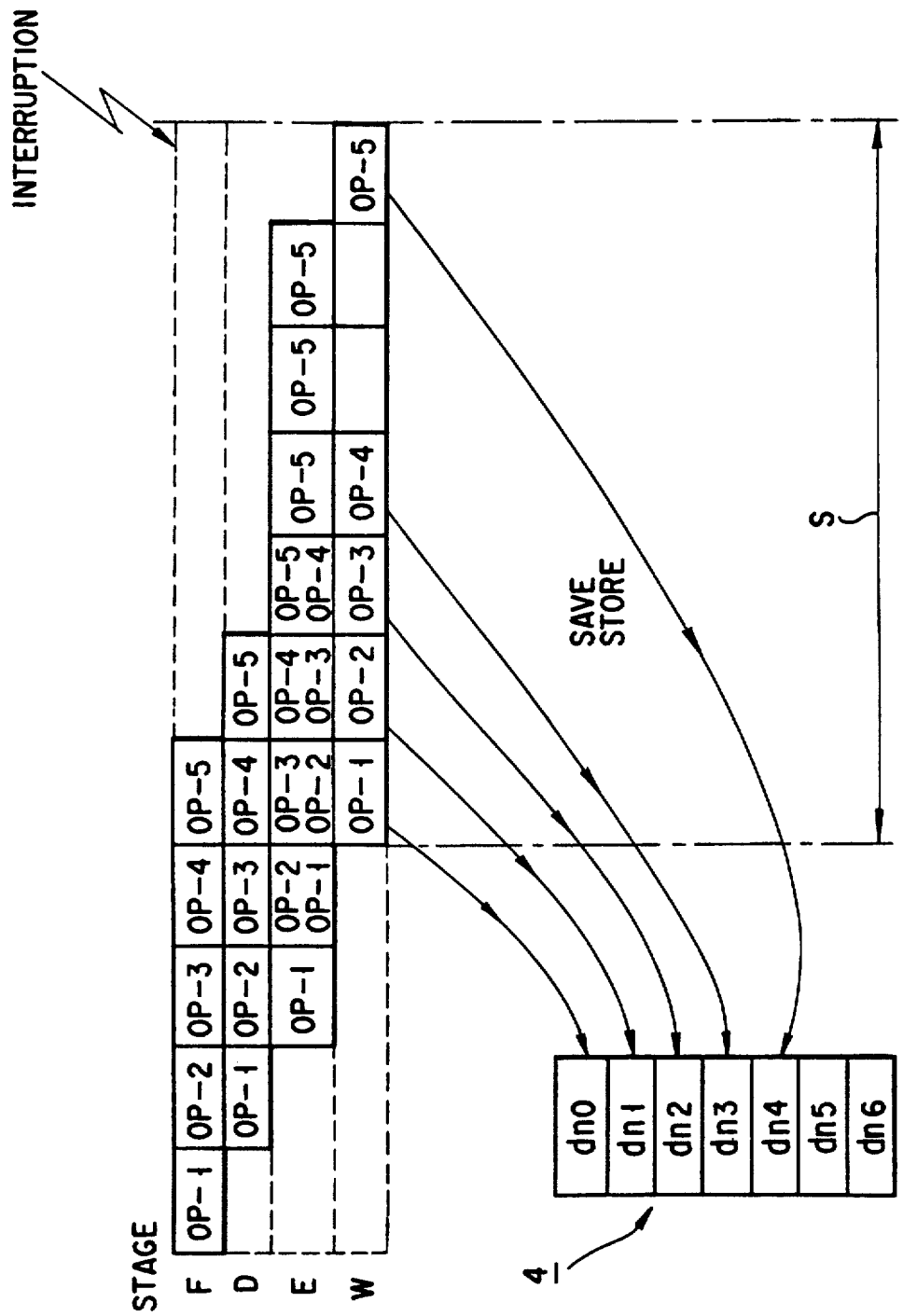
FIG. 5 is a view for explaining an error information saving operation of the second embodiment.
Figure 6:
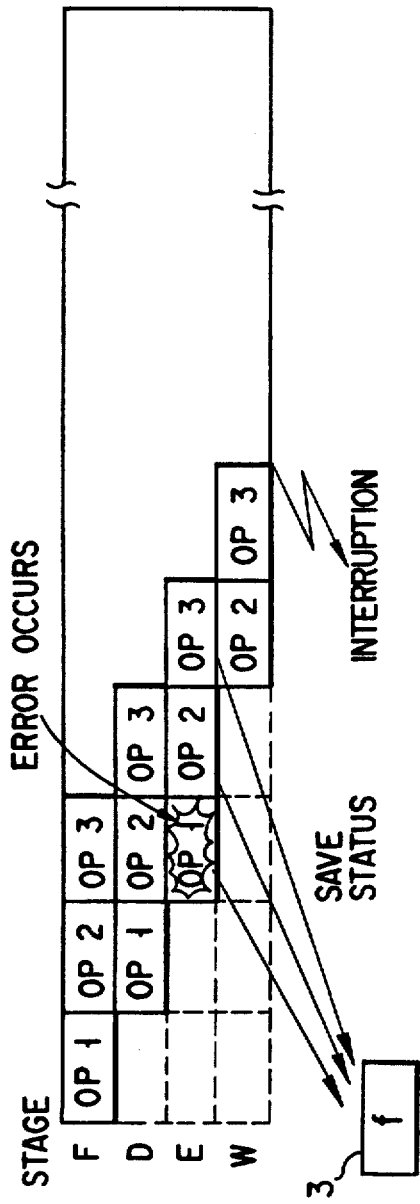
FIG. 6 is a view showing a conventional error information saving operation and a conventional error information saving register.
Figure 7:
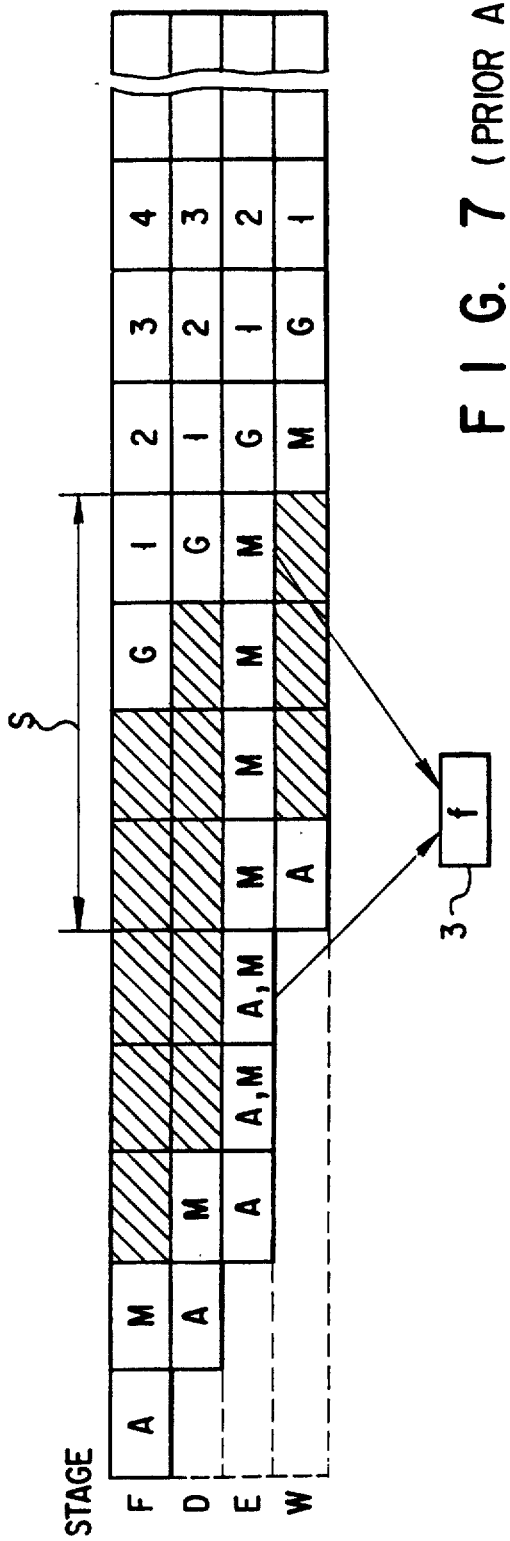
FIG. 7 is a view showing a conventional error information saving operation performed by parallel processing.
Figure 8:
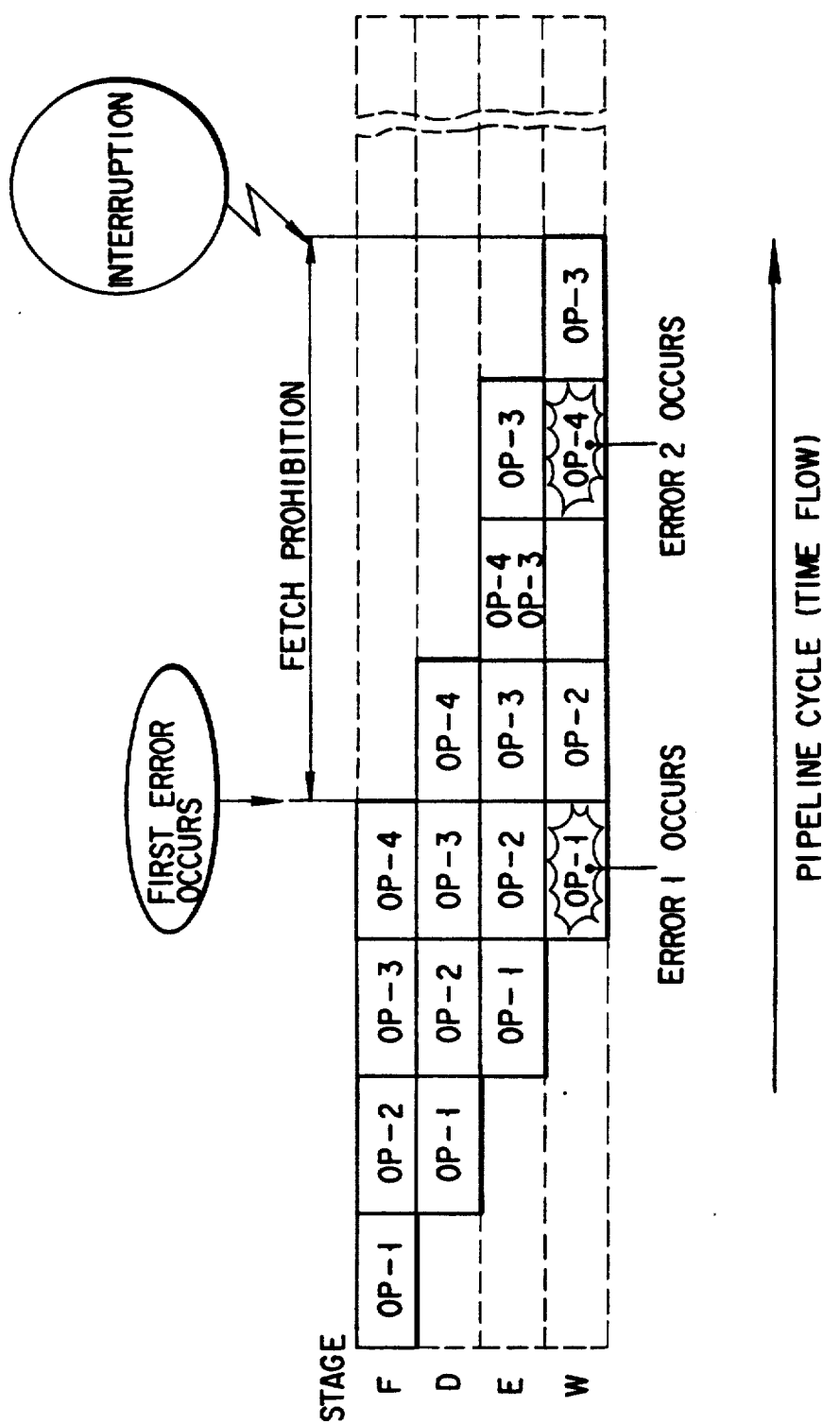
FIG. 8 is a view showing a conventional error information saving operation at the time of occurrence of multiple errors.

As shown in FIG. 5, an instruction pipeline is constituted by four stages of fetch (F), decode (D), execute (E), and write-back (W). A computer can process instructions sequentially in units of these stages in a pipeline manner by performing a pipeline operation using an optimal one of the arithmetic units 1.

In the second embodiment, it is assumed that the maximum number of operation results which can be written-back before completion of execution of instructions already fetched before occurrence of an error is seven, and that an error occurs in only the write-back stage (W). The operation of the second embodiment based on these assumptions will be described below.

Each time an operation advances to the write-back stage (W), the status of the operation is written in a flag required to be written-back, i.e., one of the status flags f0, f1, f2, . . ., fn of the flag string, which corresponds to one of the registers r0, r1, r2, . . ., rn of the register file, which is designated by that operation, under the control of the controller 5.

A series of operations performed in a time interval S from occurrence of an error to activation of interrupt processing will be described below with reference to FIG. 5.

(1) Immediately after an error occurs, a corresponding destination register number is written in, e.g., the first register dn0 of the destination register number holding unit 4 by a predetermined control mechanism of the controller 5.

(2) In order to continue a pipeline operation without causing any conflict after returning from "interrupt processing", fetch (F) of new instructions is stopped and all instructions already fetched are processed.

(3) After the processing of these instructions are completed, the interrupt processing (e.g. for detecting and correcting the cause of the error) is executed. Before execution of this interrupt, however, each time one of these operation instructions advances to its write-back cycle, the status of that operation is written in one of the status flags f0 to fn of the status flag string 3, which corresponds to a destination register of the operation (i.e., a register to be written-back), as shown in FIG. 5. At the same time, the number of that destination register is written in one of the registers dn1 to dn6 of the destination register number holding unit 4.

As a result, in the subsequent interrupt processing caused by the error, the destination register number used in the operation which caused the error can be directly recognized by referring to the error information stored in, e.g., the register dn0 of the destination register number holding unit 4. In addition, the status of that operation can also be confirmed by referring to the corresponding flag f0 of the status flag string 3.

Furthermore, by referring to the information stored in the registers dn1 to dn6 of the destination register number holding unit 4, it is possible to confirm the order of completion of processing and the destination register numbers of all the operation instructions executed during the time interval S from occurrence of the error to activation of the interrupt. In addition, it is possible to easily recognize whether an error occurs in these operations or the statuses of the operations by referring to the contents of the status flags f0 to fn of the status flag string 3 as well as the status of the first operation.

The second embodiment of the present invention can achieve the following effects. That is, each time an operation is completed, the status of the operation can be saved and held in a flag with a corresponding number in the status flag string 3 under the control of the controller 5. In addition, the destination register numbers of all operations executed during a time interval from occurrence of an error to activation of an error interrupt can be sequentially saved and held in the destination register number holding unit 4 each time processing of one of these operations is completed. As a result, the number of the destination register of an operation instruction which caused the error can be directly recognized by referring to the contents of the destination register number holding unit 4 of this embodiment.

It is also possible to confirm the status of that operation instruction by referring to one of the flags of the status flag string 3, which corresponds to the destination register number held in the destination register number holding unit 4. In addition, this embodiment makes it possible to confirm the presence/absence of operations during a time interval from occurrence of an error to activation of an interrupt. If a plurality of operations are performed in this time interval, the order of completion of these operations or whether they are normally completed can also be confirmed as the history of the processing. As a result, these constituting elements can be effectively used in error recovery of online employment and developing programs and operation tests (e.g., debug and maintenance).

As has been described above, successful recovery against errors by the error recovery function is provided, and the reliability as a computer system can be remarkably improved without sacrificing the basic performance of processing.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An error information saving apparatus of a computer, comprising at least one arithmetic unit, a plurality of storage means used in processing performed by said arithmetic unit, and control means, connected to said storage means and said arithmetic unit, for controlling said storage means and said arithmetic unit to perform a predetermined pipeline operation, wherein
    said storage means comprise
    an arithmetic register file consisting of a plurality of registers each of which can be designated as a destination operand in a statement of an operation instruction, and
    a status flag string consisting of a plurality of flags provided in a one-to-one correspondence with said registers of said arithmetic register file.

2. The apparatus according to claim 1, further comprising operation destination register number holding means provided in a one-to-one correspondence with said status flag string which corresponds to the operation instruction statement and holds a status indicating a result of the operation instruction.

3. The apparatus according to claim 2, wherein, if an error occurs in an execute stage of a first operation instruction, said control means performs control such that a first status of the first operation instruction is saved in a first flag at a top of empty flags of said status flag string, which corresponds to one of said operation destination registers of said register file, which is designated by the first operation instruction, and that a second status obtained in an execute stage of a subsequent second operation instruction is saved in a second flag subsequent to said first flag of said status flag string.

4. An error information saving apparatus of a computer, comprising at least one arithmetic unit, a plurality of storage means used in processing performed by said arithmetic unit, and control means, connected to said storage means and said arithmetic unit, for controlling said storage means and said arithmetic unit to perform a predetermined pipeline operation, wherein said storage means comprise
    an arithmetic register file consisting of a plurality of registers each of which can be designated as a destination operand in a statement of an operation instruction,
    a status flag string consisting of a plurality of flags provided in a one-to-one correspondence with said registers of said arithmetic register file, and
    destination register number holding means (4) for sequentially saving and holding numbers of destination registers of all operations performed while error interrupt processing generated after occurrence of an error is delayed by a predetermined time interval, each time one of the operations is completed.

5. The apparatus according to claim 4, wherein said destination register number holding means comprises a plurality of register elements provided in a number equal to the number of said registers constituting said register file, and all instruction statements from an instruction statement fetched at a time an error occurs to an instruction statement fetched immediately before an interrupt is generated are sequentially stored in this order in said register elements of said destination register number holding means from a first register element.

* * * * *